April 27, 1948.                F. DEDEK                2,440,575
                     ELECTROMAGNETIC TESTING DEVICE
                        Filed April 15, 1944

INVENTOR.
Frank Dedek
BY
Barnes, Kisselle, Laughlin & Raisch
    Attorneys

Patented Apr. 27, 1948

2,440,575

UNITED STATES PATENT OFFICE 2,440,575

ELECTROMAGNETIC TESTING DEVICE

Frank Dedek, Detroit, Mich., assignor to Magnetic Products Corporation, Detroit, Mich., a corporation of Michigan Application April 15, 1944, Serial No. 531,186

8 Claims. (Cl. 175—183)

This invention relates to a contact head for an electromagnetic device for determining the properties of materials possessing magnetic properties, and particularly ferrous materials.

In copending application of Theodore S. Bindschedler and Carl K. Davis, Serial No. 336,694, filed May 23, 1940, now Patent No. 2,351,595, dated June 20, 1944, there is shown an electromagnetic testing device for testing the physical, chemical and heat treatment properties of the surface of magnetic materials.

It is the object of this invention to produce an improved, more efficient and accurate work contact head for such an electromagnetic testing device.

In the drawings:

Fig. 1 is a perspective view of the complete testing device such as shown and described in the above-mentioned copending application but provided with my new work contact head.

Figure 2:
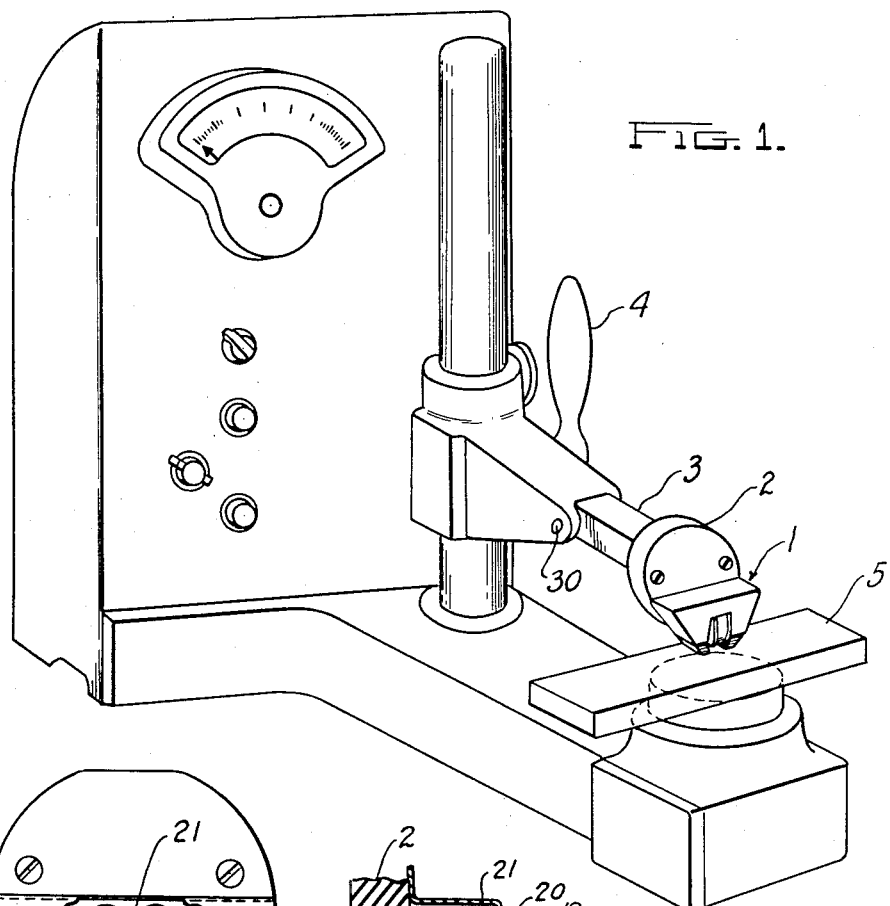
Fig. 2 is a front elevation of my work contact head.
Figure 3:
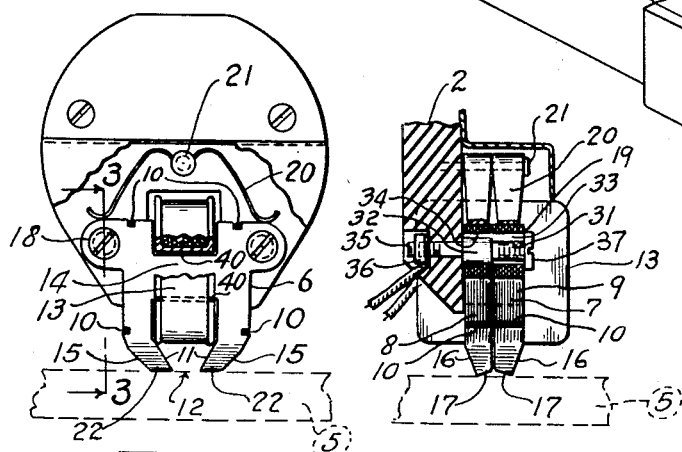
Fig. 3 is a side elevation of my work contact head taken along the line 3—3 of Fig. 2.

Referring more particularly to the drawings the work contact head is generally designated 1 and comprises a block of insulating material 2 mounted on an arm 3 pivoted on pin 30 and controlled by handle 4 so that the head can be lowered into contact and raised out of contact with the work 5, the surface of which is to be tested.

The magnetic circuit comprises an H-shaped iron core 6 made in two separate sections 7 and 8. Each section comprises a plurality of thin iron laminations 9. Sections 7 and 8 are identical in form and structure. The laminations 9 for each section are joined together, preferably by silver solder. To this end a plurality of transverse grooves 10 are provided in the surface of each section 7 and 8. These grooves 10 serve as wells for the silver solder which is applied to the laminated sections in these grooves. Thus, each section 7 and 8 moves upwardly and downwardly as a unit or whole. The sections toe inwardly as at 11 and form an air gap 12 between the pole tips which is arranged to be bridged by the magnetic or ferrous material 5, the surface of which is being tested. Air gap 12 is narrower than the air gap nearer the coil so that the path of the flux through the test piece 5 is more permeable than any path through the air which the flux might take. The lower ends 22 of the iron core form pole pieces. An exciting coil of wire 13 surrounds the bridge portion 14 of the core 6 as shown. Preferably the coil should have a loose fit on, or a small clearance with, the bridge along its top and bottom edges as indicated at 40, Fig. 2. The exciting coil 13 is arranged to be traversed by an electric current so that a magnetic flux will be caused to flow through core 6 and through air gap 12. Preferably the electric current traversing exciting coil 13 is an alternating current of high frequency which causes an alternating magnetic flux to flow in core 6 and in air gap 12 when test piece 5 does not bridge this gap 12.

The sides of the lower ends of core sections 7 and 8 adjacent their line of contact with the work 5 taper inwardly and downwardly as at 15 and the front and rear sides of the lower ends of the core adjacent their contact with the work also taper inwardly and downwardly as at 16. The bottom faces of the core are slightly inclined upwardly and inwardly as at 17 to form a shallow V groove or relief as shown.

The core sections 7 and 8 are supported upon the insulating block 2 by pins 18 which pass through openings 19 in the core sections. Openings 19 are preferably of the same diameter or size. Openings 19 are somewhat larger than pins 18 so that the pins 18 have a clearance in openings 19 thereby permitting sections 7 and 8 to float upwardly and downwardly on supporting pins 18. It is important that rear section 8 have less float on pins 18 than front section 7 for reasons explained below. This is accomplished by having openings 19 in the front and rear core section of the same size or diameter and by forming pins 18 with a reduced portion 31 in openings 19 of front section 7. In other words, the diameter of the front portions 31 of pins 18 is smaller than the diameter of the rear portions 32 of pins 18. Thus, the clearance 33 that pins 18 have in openings 19 in the front section 7 is greater than the clearance 34 which pins 18 have in the openings in rear section 8. Pins 18 have their rear ends threaded as at 35 and are secured in place by nuts 36. Screws 37 turn into tapped openings in the front of pins 18 for retaining sections 7 and 8 on supporting pins 18. Sections 7 and 8 are urged downwardly by independent leaf springs 20 positioned in tension between the top surfaces of sections 7 and 8 and post 21 carried on insulating block 2.

Unless the work contact head 1 makes contact with each piece of work to be tested at the same points or over the same area, the reluctance of the magnetic circuit will be changed and the test readings will vary and be inaccurate. Therefore it is important that work contact 1 make an identical contact, that is, contact the work over the same area, with each work piece being tested. The floating of the front and rear sections 7 and 8 assists materially in obtaining a constant contact area with the work pieces being tested. In operation as arm 3 swings down about pivot 30, the rear section 8 first contacts the work and moves upwardly until the bottom of opening 19 in rear section 8 abuts against the underside of portion 32 of pins 18. Thus the engagement of section 8 with the work and the bottoming of portions 32 of pins 18 in openings 19 of the rear section 8 arrests or stops and determines the final lowered or test position of arm 3. Front section 7, due to its greater clearance 33 with pins 18, freely adjusts itself to the work and brings its pole tips 22 into contact with the surface of the work even though there may be slight irregularity in the surface of the work piece being tested. It is, of course, understood that springs 20 at all times urge the front and rear sections of core 6 downwardly. The relief 17 in the bottom of the core sections 7 and 8 also assists in obtaining a constant contact area with the work pieces being tested.

The flow of alternating current in exciting coil 13 is affected by the presence of test piece 5. If test piece 5 has good magnetic characteristics, it will cause the flow of alternating current through the exciting coil to be greatly limited while a test piece with poor magnetic characteristics will check the flow of the alternating current only slightly. Therefore, a valve action is set up which may be called "variable coil inductance" in electrical phraseology and which may be used for the purpose of comparing magnetic characteristics of steel and iron. The variation in these characteristics may be caused by the introduction of alloys, carbon, by heat treatment, or by mechanical operations such as rolling or drawing as described in the above copending application.

The work contact piece, as above described, has been designed to eliminate errors in the electromagnetic testing of magnetic materials caused by imperfect magnetic contacts between the work and the pole pieces 22 or by magnetic contacts having different areas for each work piece tested.

I claim:

1. In an electromagnetic testing device for testing the physical, chemical or heat treatment properties of magnetic materials, a head arranged to be lowered into and raised from contact with the work to be tested, said head comprising a support, a core of high permeability comprising at least two sections, each section of said core comprising a plurality of laminations, each core section comprising a pair of legs adapted to contact the work to be tested and an interconnecting bridge portion, means for joining the laminations of each section together, an exciting coil circumscribing the interconnecting bridge portion of said sections, and means constructed and arranged for independently and yieldably supporting the said sections in juxtaposition on said support whereby as the support is lowered the pole tips of each section make individual contact with the surface of the work.

2. In an electromagnetic testing device for testing the physical, chemical or heat treatment properties of magnetic materials, a head arranged to be lowered into and raised from contact with the work to be tested, said head comprising a support, a core of high permeability comprising at least two sections, each section of said core comprising a plurality of laminations, each core section comprising a pair of legs adapted to contact the work to be tested and an interconnecting bridge portion, silver solder for joining the laminations of each section together, an exciting coil circumscribing the interconnecting bridge portion of said sections, and means constructed and arranged for independently and yieldably supporting the said sections in juxtaposition on said support whereby as the support is lowered the pole tips of each section make individual contact with the surface of the work.

3. In an electromagnetic testing device for testing the physical, chemical or heat treatment properties of magnetic materials, a head arranged to be lowered into and raised from contact with the work to be tested, said head comprising a support, a core of high permeability comprising at least two sections, each section of said core comprising a plurality of laminations, each core section comprising a pair of legs adapted to contact the work to be tested and an interconnecting bridge portion, means for joining the laminations of each section together, an exciting coil circumscribing the interconnecting bridge portion of said sections, a pair of pins mounted on said support, each section having a pair of openings into which said pins project, the said openings having a clearance with said pins, and resilient means mounted on said support and in contact with said core sections for independently backing up said core sections whereby said sections are capable of a limited movement relative to each other and to the said support.

4. In an electromagnetic testing device for testing the physical, chemical or heat treatment properties of magnetic materials, a head arranged to be lowered into and raised from contact with the work to be tested, said head comprising an insulating support, a core of high permeability comprising at least two sections, each section of said core comprising a plurality of laminations, each core section comprising a pair of legs adapted to contact the work to be tested and an interconnecting bridge portion, means for joining the laminations of each section together, an exciting coil circumscribing the interconnecting bridge portion of said sections, a pair of pins mounted substantially horizontally on said insulating support, a pair of openings for each section of said core for receiving said pins, the said core sections being mounted on said pins in juxtaposition and in contact one with the other, a clearance between each of the pins and its opening in the core sections whereby the core sections are free to have a limited float upwardly and downwardly on said pins, and resilient means mounted on said support and in contact with said core sections for independently urging said core sections downwardly whereby said sections are capable of a limited movement relative to each other and to the said support.

5. In an electromagnetic testing device for testing the physical, chemical or heat treatment properties of magnetic materials, a head arranged to be lowered into and raised from contact with the work to be tested, said head comprising an insulating support, a core of high permeability comprising at least two sections, each section of said core comprising a plurality of laminations, each core section comprising a pair of legs adapted to contact the work to be tested and an interconnecting bridge portion, means for joining the laminations of each section together, an exciting coil circumscribing the interconnecting bridge portion of said sections, said insulating support having a substantially vertical face, a pair of pins mounted on said insulating support substantially perpendicular to said face, openings in said core sections for said pins whereby the core sections are mounted on said pins in juxtaposition and with the rear core section against the vertical face of said insulating support, clearances between each of the openings in said core sections and said supporting pins whereby said core sections in contacting the work are capable of a limited vertical movement relative to said support pins and relative to each other, and springs positioned on said support above and in contact with said core sections for independently yieldably urging the same downwardly.

6. The combination as set forth in claim 5 wherein the openings in the front core section have a greater clearance with the said support pins than the openings in the rear section of said core.

7. The combination as set forth in claim 5 wherein the openings in said core sections are of substantially the same size and the portion of said pins in the openings of the front core sections are reduced in cross section whereby the front section has a greater substantially vertical float than the rear core section.

8. In an electromagnetic testing device for testing the physical, chemical or heat treatment properties of magnetic materials, a head arranged to be lowered into and raised from contact with the work to be tested, said head comprising an insulating support, a core of high permeability comprising at least two sections, each section of said core comprising a plurality of laminations, each core section comprising a pair of legs adapted to contact the work to be tested and an interconnecting bridge portion, the pole tips of said core sections being relieved inwardly and upwardly, means for joining the laminations of each section together, an exciting coil circumscribing the interconnecting bridge portion of said sections, and means constructed and arranged for independently and yieldably supporting the said sections in juxtaposition on said support whereby as the support is lowered the pole tips of each section make individual contact with the surface of the work.

FRANK DEDEK.

REFERENCES CITED

The following references are of record in the file of this patent:

UNITED STATES PATENTS

| Number | Name | Date |
|---|---|---|
| 2,351,595 | Bindschedler et al. | June 20, 1944 |